(12) United States Patent
Yaita et al.

(10) Patent No.: US 9,093,185 B2
(45) Date of Patent: Jul. 28, 2015

(54) METHOD OF AND SYSTEM FOR SUPPRESSING DEPOSITION OF RADIOACTIVE SUBSTANCE

(75) Inventors: Yumi Yaita, Ota-Ku (JP); Teruki Fukumatsu, Onga-Gun (JP); Hiromi Aoi, Yokohama (JP); Yutaka Uruma, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 481 days.

(21) Appl. No.: 13/375,093

(22) PCT Filed: May 28, 2010

(86) PCT No.: PCT/JP2010/059097
§ 371 (c)(1),
(2), (4) Date: Nov. 29, 2011

(87) PCT Pub. No.: WO2010/137693
PCT Pub. Date: Dec. 2, 2010

(65) Prior Publication Data
US 2012/0069949 A1    Mar. 22, 2012

(30) Foreign Application Priority Data
May 29, 2009  (JP) ................ 2009-130724

(51) Int. Cl.
*G21C 9/00* (2006.01)
*G21F 9/28* (2006.01)
*C23C 24/00* (2006.01)
*G21F 9/00* (2006.01)

(52) U.S. Cl.
CPC . *G21F 9/28* (2013.01); *C23C 24/00* (2013.01); *G21F 9/001* (2013.01); *G21F 9/004* (2013.01)

(58) Field of Classification Search
None
See application file for complete search history.

(56) References Cited

U.S. PATENT DOCUMENTS

| 3,886,415 | A  | * | 5/1975  | Genthe ................... 361/314 |
| 2006/0067455 | A1 | * | 3/2006  | Hosokawa et al. ........... 376/310 |
| 2006/0146975 | A1 | * | 7/2006  | Okamura et al. ............ 376/305 |
| 2009/0152203 | A1 | * | 6/2009  | Denton ................... 210/695 |
| 2009/0308144 | A1 | * | 12/2009 | Dorsch ..................... 73/86 |
| 2011/0122986 | A1 | * | 5/2011  | Yamamoto et al. .......... 376/310 |

FOREIGN PATENT DOCUMENTS

| JP | 2001 276628  |   | 10/2001 |           |
| JP | 2002 131473  |   | 5/2002  |           |
| JP | 2003 139891  |   | 5/2003  |           |
| JP | 2005 349308  |   | 12/2005 |           |
| WO | 2009 025330  |   | 2/2009  |           |
| WO | 2009025330   | * | 2/2009  | ........ G21D 9/00 |

OTHER PUBLICATIONS

International Search Report Issued on Aug. 10, 2010 in PCT/JP10/59097 Filed May 28, 2010.
International Preliminary Report on Patentability and Written Opinion issued Dec. 12, 2011 in patent application No. PCT/JP2010/059097 filed on May 28, 2010.

* cited by examiner

*Primary Examiner* — Jack W Keith
*Assistant Examiner* — Marshall O'Connor
(74) *Attorney, Agent, or Firm* — Oblon, McClelland, Maier & Neustadt, L.L.P.

(57) ABSTRACT

A radioactive substance is effectively suppressed by an oxide-film removal step of removing an oxide film on a metallic material surface with which a coolant containing the radioactive substance comes in contact, and a titanium-oxide deposition step of depositing a titanium oxide on the metallic material surface after the oxide film has been removed.

7 Claims, 5 Drawing Sheets

METHOD OF AND SYSTEM FOR SUPPRESSING DEPOSITION OF RADIOACTIVE SUBSTANCE

TECHNICAL FIELD

The present invention relates to a technology for suppressing the deposition of a radioactive substance onto a metallic material surface with which a coolant containing a radioactive substance comes in contact, and specifically, relates to a method of and system for suppressing the deposition of the radioactive substance after a chemical decontamination operation.

BACKGROUND ART

In a light water reactor (LWR) using water as a coolant, measures for the reduction of a radiation exposure dose for workers in periodic inspection works (periodic inspection), preventive maintenance works and the like have become important. As a part of such measures, a chemical decontamination operation has been frequently applied to structural materials, pipes, pumps and the like of the reactor. The chemical decontamination can remove an oxide film on the metallic material surface (hereafter referred to as structural material surface) with which a coolant containing a radioactive substance comes in contact, such as a structural material, and as a result, can remove radioactive substances such as cobalt-60 and cobalt-58 in a crud or in the oxide film on the metallic material surface, by combining reductive dissolution, oxidative dissolution and the like with the use of chemicals.

However, when the reactor is restarted after the decontamination operation, the radioactive substance will again deposit on the structural material surface. The deposition of the radioactive substance occurs together with the formation of the oxide film. Because the film grows at a high speed on a bared surface of metal after the decontamination operation, a radioactive substance is quickly deposited on that surface, and as a result, a dosage rate of the structural material surface rises again in a short time after the decontamination operation.

In order to solve this problem, there are proposed a method of forming an iron oxide film by bringing high-temperature water, steam, oxygen or ozone into contact with the surface of the material after the decontamination operation (Patent Documents 1 and 2), and a method of forming an iron oxide film by bringing a chemical agent containing an iron ion into contact with the surface of the material after the decontamination operation (Patent Documents 2 and 3).

In addition, as a general way to suppress the deposition of radioactivity, there is proposed a method of forming a film that resists capturing the radioactivity by injecting zinc or the like during the operation of the reactor (Patent Document 4).

PRIOR ART DOCUMENTS

Patent Documents

Patent Document 1: Japanese Patent Laid-Open Publication No. 2004-294393
Patent Document 2: Japanese Patent Laid-Open Publication No. 2002-236191
Patent Document 3: Japanese Patent Laid-Open Publication No. 2006-38483
Patent Document 4: Japanese Patent Laid-Open Publication No. 8-292290

DESCRIPTION OF THE INVENTION

Problem to be Solved by the Invention

By the way, a conventional technology of previously forming the iron oxide film on the structural material surface can suppress an amount of the radioactive substance captured during the initial corrosion of the material. However, this conventional technology does not suppress the capturing action itself. Accordingly, the amount of the captured radioactive substance increases with time. In addition, in the technique of forming the film during the operation of the reactor, it is necessary to always control the operating state during the operation, resulting in a high work load for workers.

In addition, in order to form a film other than the iron oxide film on the structural material surface, it is necessary to inject a chemical liquid at a high temperature of 100° C. or higher, or a high-concentration solution which contains approximately 10% of the chemical agent for electroless plating or the like. It is also difficult to form the film under an atmospheric pressure condition of the reactor when the reactor is out of service, and there are various problems including a concern that a residual reagent affects the material of the reactor due to the use of the high-concentration solution.

The present invention has been achieved for solving the defects in the conventional technology mentioned above, and an object is to provide a method of and system for efficiently suppressing the deposition of a radioactive substance onto the metallic material surface after the start-up of the reactor, by applying film-forming treatment with the use of a low-concentration chemical agent to the metallic material surface with which the coolant containing the radioactive substance comes in contact, such as a structural material of which the amount of the radioactivity has been reduced by a chemical decontamination operation, at low temperature and the atmospheric pressure while the operation of the reactor is stopped for a periodic inspection or the like.

Means for Solving the Problem

In order to solve the above described problems, the present invention provides a method of suppressing deposition of a radioactive substance comprising the steps of: removing an oxide film on a metallic material surface with which a coolant containing the radioactive substance comes in contact; and depositing a titanium oxide on the metallic material surface after the removal of the oxide film.

Effects of the Invention

According to the present invention, there is provided a method of effectively suppressing the deposition of a radioactive substance onto a metallic material surface with which a coolant containing the radioactive substance comes in contact, by conducting recontamination-suppressing treatment after a chemical decontamination operation.

EMBODIMENT FOR EMBODYING THE INVENTION

Hereunder, embodiments of a method of suppressing the deposition of a radioactive substance according to the present invention will be described with reference to the accompanying drawings.

First Embodiment

A first embodiment according to the present invention will be described below with reference to FIGS. 1 to 4.

Figure 1:
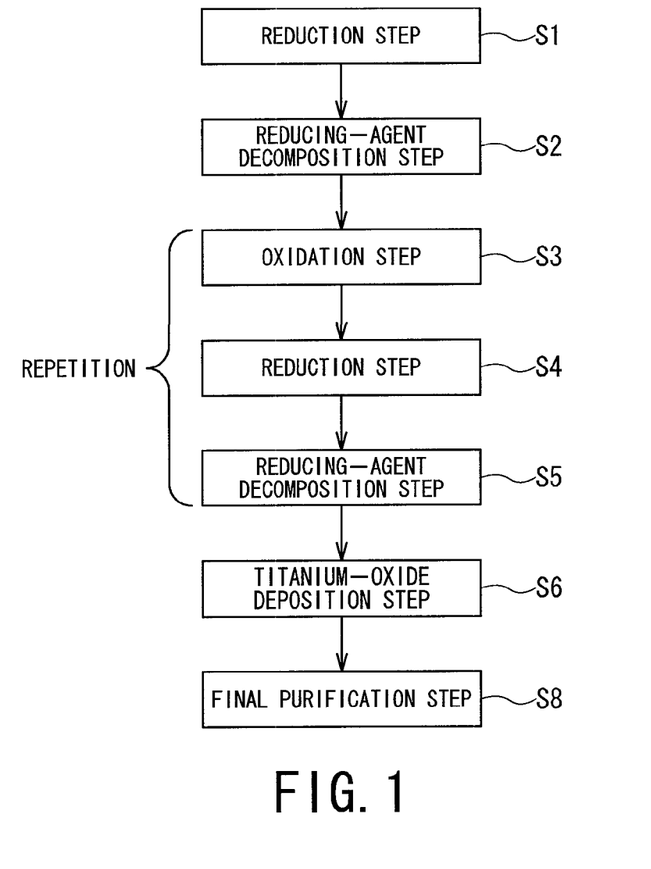
FIG. 1 is a flow chart illustrating a process of suppressing recontamination according to a first embodiment of the present invention.

FIG. 1 is a flow chart illustrating a process of suppressing the redeposition of a radioactive substance, the process including a chemical decontamination step for removing an oxide film on a metallic material surface (hereinafter referred to as structural material surface of reactor) with which a coolant containing a radioactive substance comes in contact, such as on a structural material surface of a reactor, and including a recontamination-suppressing treatment step.

In the chemical decontamination steps (S1 to S5) performed during a period in which the operation of the reactor is stopped before the restart after a periodic inspection, a stop or the like operation, an iron oxide is reduced and dissolved so as to consequently remove the contamination by reduction, by injecting a reducing agent such as oxalic acid into a pipe in order to reduce and dissolve the iron oxide in the upper layer of a portion that may become contaminated such as a pipe surface (S1); and subsequently, the reducing agent is decomposed (S2). Next, a chromium oxide is dissolved in an oxidation step with the use of an oxidizing agent (S3); and a reducing agent is injected into the pipe (S4). According to these steps, the oxidizing agent is decomposed by the excessive reducing agent. Next, the reducing agent is decomposed after the reduction treatment (S5). The oxidation step, the reduction step and the reducing-agent decomposition step (S3 to S5) are further repeated, and the oxide film on the inner surface of the pipe is removed.

After the above described chemical decontamination step, a titanium oxide is deposited onto the portion that may become contaminated, which has been chemically decontaminated, during the period in which the operation of the reactor is stopped before a rated operation (S6), in order to suppress recontamination; and thereafter, a titanium-oxide waste liquid containing a residual reducing agent is purified in the final purification step (S7).

Figure 2:
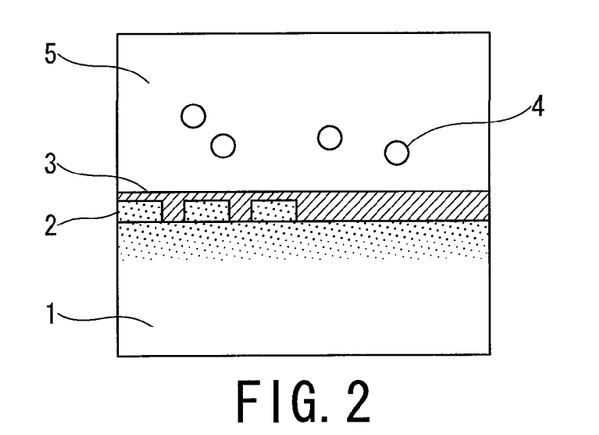
FIG. 2 is a schematic sectional view of a pipe after a chemical decontamination operation according to the first embodiment of the present invention.

FIG. 2 illustrates the state of the surface of a reactor pipe which has been subjected to the operations such as mentioned above. The surface of the pipe 1 is in such a state that the whole amount of or a part of the oxide film 2 is removed by the decontamination operation and a titanium oxide 3 deposits thereon. After the titanium oxide 3 has been deposited, the pipe 1 is subjected to the operation.

When the operation (rated operation) is restarted, cobalt 60, which is a radioactive substance 4, is included in a cooling water 5 of the reactor, and when the high-temperature cooling water 5 of the reactor comes in contact with the pipe 1, the oxide film is again progressively formed on the pipe 1. However, by making the titanium oxide 3 deposit on the pipe surface, the formation of the oxide film 2 is suppressed, and as a result, the deposition of cobalt 60 to the pipe surface can be suppressed.

(Confirmation Test)

Figure 3:
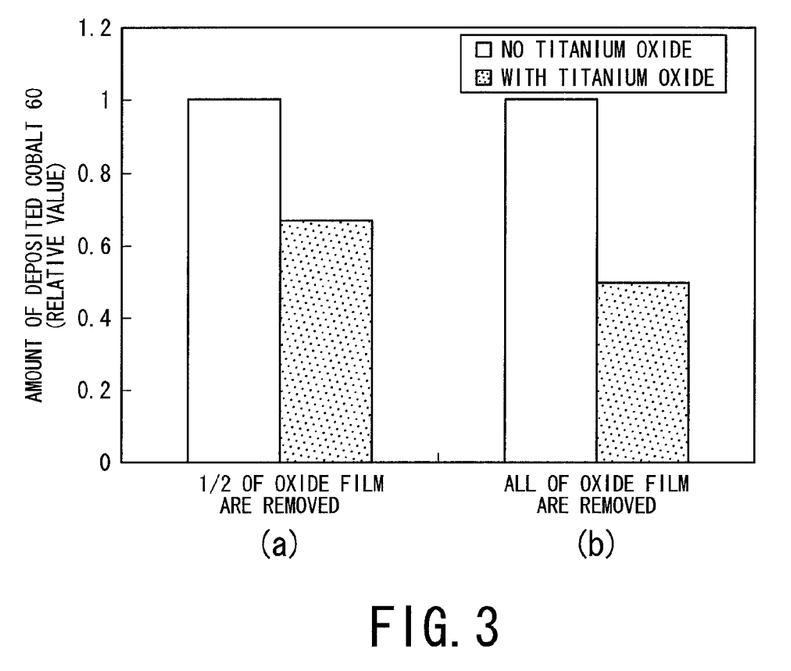
FIG. 3 is a view comparing the amounts of deposited radioactivity according to the first embodiment of the present invention.
Figure 4:
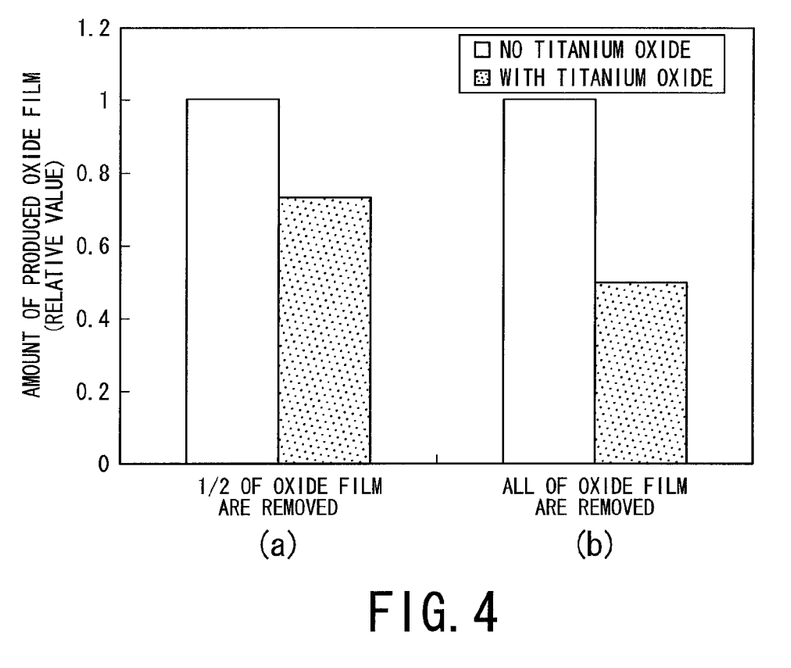
FIG. 4 is a view comparing the amounts of produced oxide films according to the first embodiment of the present invention.

FIG. 3 and FIG. 4 are graphs representing results of a radioactivity deposition test of making titanium dioxide, which is a titanium oxide, deposited on the metal after the chemical decontamination operation.

Two types of test pieces were prepared. A first was a test piece from which approximately half of an oxide film was removed. A second was a test piece from which almost all of the oxide film was removed (stainless steel: SUS316L based on Japanese Industrial Standard (JIS)). In the test pieces an oxide film was formed under the condition of the reactor water, and by repeatedly oxidizing the test pieces by ozone and reducing the resultant test pieces by oxalic acid, and titanium dioxide was deposited on these test pieces. Thereafter, these test pieces were immersed in a water of 280° C. for 500 hours, which included cobalt 60.

FIG. 3 shows an amount of deposited radioactivity of each test piece. It is understood from FIG. 3 that the amount of deposited radioactivity of the test piece having the titanium dioxide deposited thereon decreases to ⅔ to ½ of the test piece having no titanium dioxide deposited thereon.

FIG. 4 also shows a removed amount of the oxide film formed on the metallic test piece which has been tested.

It is understood from the results shown in FIG. 4 that the amount of the produced oxide film of the test piece having the titanium dioxide deposited thereon is small in comparison with that of the test piece having no titanium dioxide deposited thereon, regardless of a residual rate of the oxide film after the decontamination operation.

It is also understood that the production of the oxide film on the metallic surface is suppressed by the deposition of titanium dioxide, and as a result, the deposition of radioactivity is suppressed, with the result that an effect of reducing the amount of the produced oxide film substantially coincides with the effect of reducing the deposition of radioactivity.

In addition, a period necessary for a final purification step among the whole steps (S1 to S7) of decontamination is relatively long, and approximately one to two days are required in the case in which the primary system of a boiling-water reactor is decontaminated. Accordingly, if the titanium dioxide treatment is conducted after the final purification step, it becomes necessary to purify the system again, which results in extremely extending a time period for the whole process.

However, in the present invention, the period necessary for the recontamination-suppressing treatment step after the chemical decontamination operation is shortened to the minimum by conducting titanium-dioxide deposition treatment before the final purification step.

According to the described first embodiment, there can be provided a method for suppressing the deposition of the radioactive substance, which can efficiently suppress the deposition of the radioactive substance onto the structural material of a nuclear power plant by conducting a recontamination-suppressing treatment at a low temperature and under the atmospheric pressure after the chemical decontamination operation, while the operation of the reactor is stopped at the time of a periodic inspection or the like.

Second Embodiment

Hereunder, a second embodiment according to the present invention will be described with reference to FIG. 5 to FIG. 7.

Figure 5:
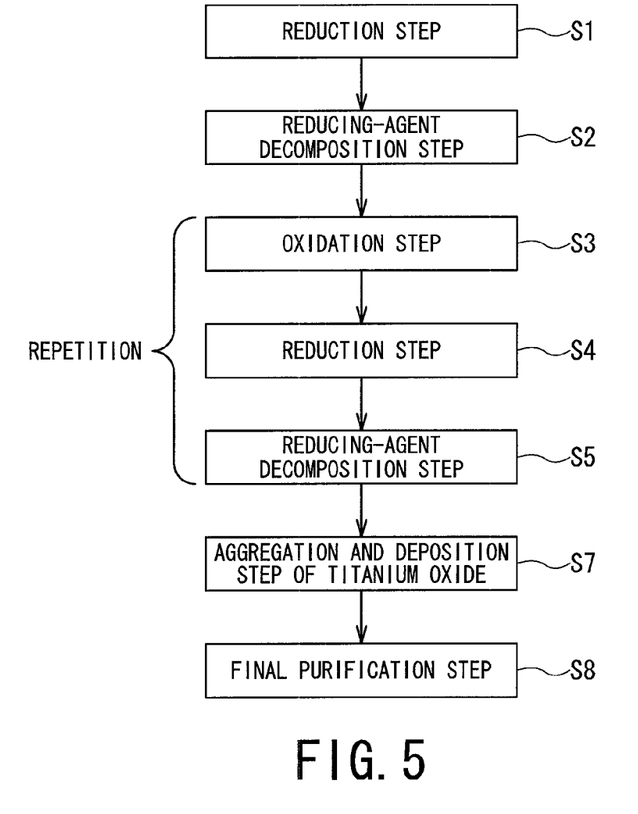
FIG. 5 is a flow chart illustrating a process of suppressing recontamination according to a second embodiment of the present invention.

FIG. 5 is a flow chart representing a process of suppressing the redeposition of a radioactive substance, which shows a chemical decontamination step for removing an oxide film formed on a structural material surface of a reactor and a recontamination-suppressing treatment step.

In FIG. 5, in steps S1 to S5, the chemical decontamination operation of repeating the oxidation step and the reduction step is conducted in a manner similar to that in the first embodiment. After the reducing-agent decomposition step (S5), an aggregation and deposition step (S7) of a titanium oxide is conducted as recontamination-suppressing treatment. Thereafter, the titanium-oxide waste liquid containing the residual reducing agent is purified in a final purification step (S8).

A titanium oxide solution contains titanium oxide particles and a dispersing agent. The dispersing agent has a function of dispersing the titanium oxide particles in a solution. The process according to the second embodiment realizes enhancement of the adhesion performance of the titanium oxide particles to a surface of a metal by converting the titanium oxide particles in the solution into an aggregated state by a heat treatment, an addition of an electrolyte or the like.

However, when the aggregation of the titanium oxide particles excessively proceeds, the titanium oxide sediments and the injection itself may become difficult, and it is accordingly desirable to conduct the deposition treatment by using the solution in the state of keeping some extent of dispersibility even though aggregation has been caused therein.

Figure 6:
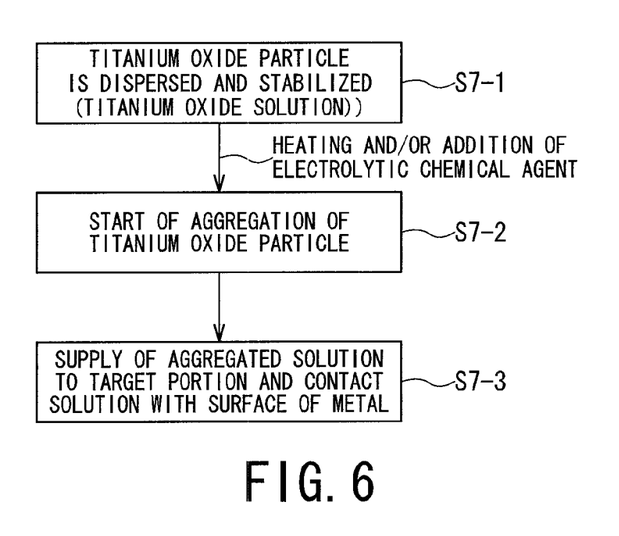
FIG. 6 is a flow chart illustrating an aggregation treatment and deposition step of a titanium oxide according to the second embodiment of the present invention.

FIG. 6 is a flow chart representing an aggregation treatment and deposition step of a titanium oxide (S7).

The titanium oxide particles in the titanium oxide solution having the titanium oxide particles dispersed and stabilized therein (S7-1) are made to start to aggregate by heating and/or addition of an electrolytic chemical agent (S7-2). The electrolytic chemical agent added to the solution at this time may be oxalic acid which is used as a reductive decontamination agent. In addition, in order to suppress excessive aggregation, the temperature of the chemical liquid may be lowered after the start of the aggregation treatment.

Figure 9:
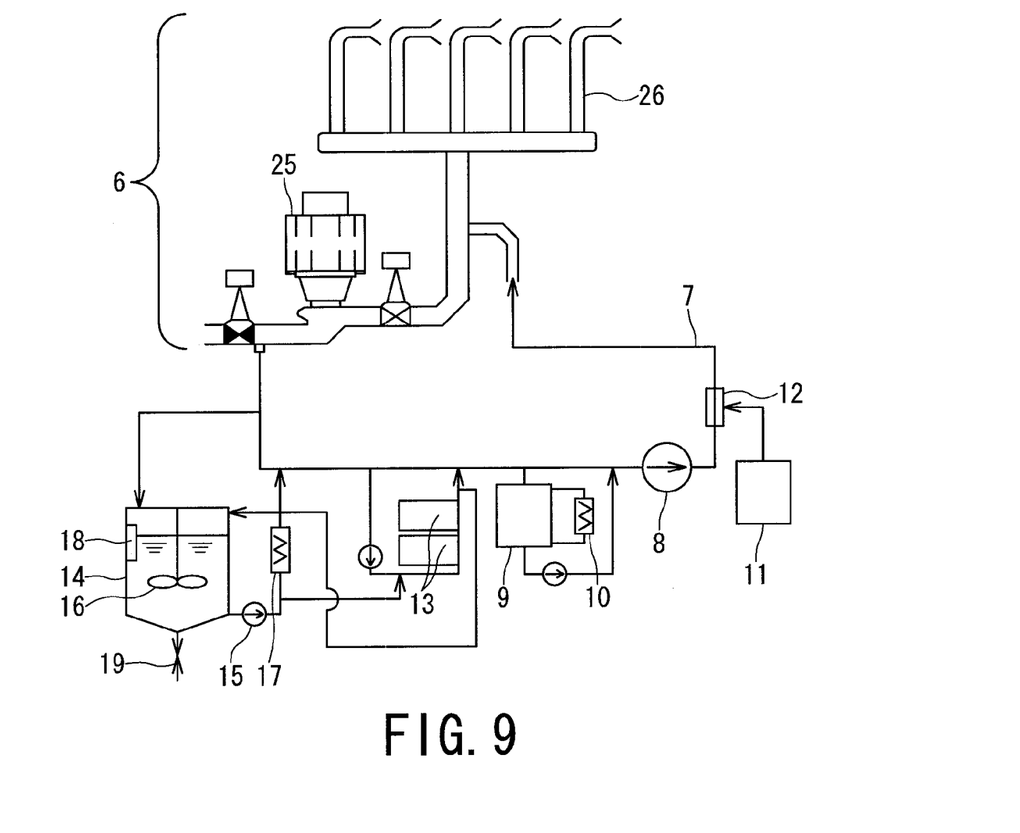
FIG. 9 is a schematic diagram illustrating an entire structure of a system for recontamination-suppressing treatment, which includes an apparatus for suppressing redeposition according to a fourth embodiment of the present invention.

Next, the titanium oxide is deposited onto a surface of the metal by supplying a solution in which the aggregation has started to a reactor site to be subjected to the recontamination-suppressing treatment through the decontamination treatment system illustrated in FIG. 9, and by bringing the aggregation solution into contact with the surface of the metal (S7-3).

The state of the surface of a reactor pipe after having been subjected to such treatment becomes the state illustrated in FIG. 2 as in the first embodiment. The pipe 1 is subjected to the operation after the titanium oxide 3 has been deposited thereon.

When the operation is restarted, cobalt 60 which is a radioactive substance 4 is contained in cooling water 5 of the reactor, and when the high-temperature cooling water 5 of the reactor comes in contact with the pipe 1, the oxide film is progressively formed on the pipe 1 again. However, by making the titanium oxide 3 deposit onto the pipe surface, the formation of the oxide film 2 is suppressed, and as a result, the deposition of cobalt 60 onto the pipe surface can be suppressed.

(Confirmation Test)

Figure 7:
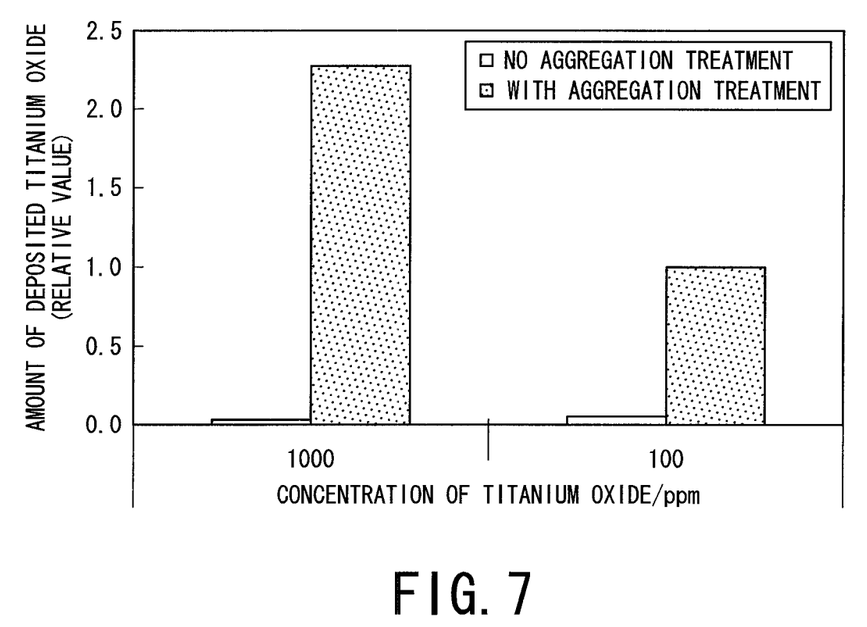
FIG. 7 is a view comparing the amounts of a deposited titanium oxide according to the second embodiment of the present invention.

FIG. 7 represents the result of cohesively depositing the titanium dioxide of a titanium oxide on the metal after the chemical decontamination operation and conducting a deposition test of radioactivity to the resultant metal.

FIG. 7 represents a graph showing the amount of the titanium dioxide deposited onto the test piece after a surface of the test piece SUS316L has been brought into contact with a titanium dioxide solution which has been subjected to the aggregation treatment by heating to 90° C., at a fixed flow rate for a fixed period of time.

It is understood from FIG. 7 that the adhesivity of the titanium dioxide in the case in which the aggregation treatment has been conducted is enhanced in comparison with the case in which no aggregation treatment has been conducted, regardless of whether the concentration of the titanium dioxide is high or low.

As described above, according to the present second embodiment, by conducting recontamination-suppressing treatment with the use of the titanium oxide solution subjected to the aggregation treatment after the chemical decontamination operation, it becomes possible to provide a method of suppressing the redeposition of a radioactive substance, whereby the deposition of the radioactive substance onto the structural material surface of the reactor can be further efficiently suppressed.

Third Embodiment

Hereunder, a third embodiment according to the present invention is described with reference to FIG. 8.

The third embodiment is characterized by controlling the residual concentration of the reducing agent after the reducing-agent decomposition step (S5) and the concentration of a dispersing agent contained in the titanium oxide solution, in the titanium-oxide deposition step (S6) in the above described first embodiment.

As described above, the titanium oxide solution contains the dispersing agent for dispersing the titanium oxide particles. The dispersing agent absorbs to the particle surface of the titanium oxide, electrifies the particles, and makes the particles in a state of being dispersed by the electrical repulsion. When an electrolyte such as oxalic acid which is used as a reductive decontamination agent is added to the solution, an electric charge of the dispersing agent is neutralized, and an electrified layer is lost. Then, it becomes impossible for the dispersing agent to keep a dispersion state, and particles aggregate. Thus, the oxalic acid which is the reductive decontamination agent has an effect of neutralizing the electric charge of the dispersing agent because the oxalic acid is an electrolyte, and can provides this aggregation effect by being left in the solution at the end of the decomposition step.

However, if the organic ions are present in excess, the positive charge of the dispersant adhering to the titanium oxide particle surface is neutralized. Further, since the organic ions itself are attached to the titanium oxide particle surfaces, the titanium oxide particles are dispersed by being negatively charged. For this reason, it is desirable to control a concentration of the electrolyte to the preferred concentration condition for the aggregation of the particles.

In consideration of the above fact, the inventors of the subject application have newly found that the optimum aggregation state can be obtained by controlling a ratio of the concentration by normality (N) of a residual reducing agent such as oxalic acid with respect to that of the dispersing agent contained in the titanium oxide solution, to about 1 or less.

Accordingly, in the present third embodiment, the ratio of the concentration by normality (N) of the residual reducing agent after a reducing-agent decomposition step to that of the dispersing agent contained in the titanium oxide solution is controlled to about 1 or less. Titanium-oxide deposition treatment (S6) is conducted, and the solution is subjected to a final purification step (S8) which includes the purification of the residual reducing agent.

(Confirmation Test)

Figure 8:
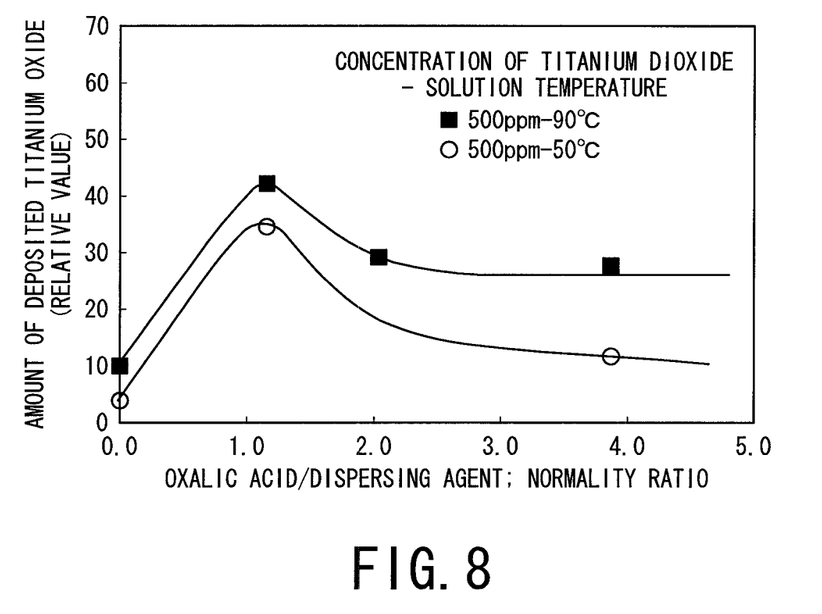
FIG. 8 is a characteristic diagram illustrating the amounts of a titanium oxide deposited onto a test piece, with respect to a dispersing agent according to a third embodiment of the present invention.

FIG. 8 is a view representing an amount of titanium dioxide deposited onto the test piece when the titanium dioxide solution has been brought into contact with the test piece SUS316L, at a fixed flow-rate for a fixed period of time, while a ratio of the normality of the dispersing agent contained in the titanium dioxide solution to the normality of the oxalic acid to be added has been varied.

As is illustrated in FIG. 8, it is understood that the deposition amount increases when the normality ratio of an oxalic acid/dispersing agent is about 1. The case in which the ratio of the normality of the oxalic acid to the normality of the dispersing agent is 1 specifically means a neutral point at which electric charges are neutralized.

Accordingly, the adhesivity of the titanium dioxide to the metal is enhanced by controlling a ratio of the concentration by the normality of the residual reducing agent to that of the dispersing agent so as to be about 1 in a reducing-agent decomposition step after the decontamination operation.

However, when the concentration of the dispersing agent in an undiluted titanium dioxide solution is originally low and the aggregation easily proceeds only by heating, an adsorption effect of an oxalate ion more remarkably appears than the charge neutralization effect, and thus, the concentration condition of oxalic acid is preferably as low as 1 or less by the normality ratio.

As described above, according to the third embodiment, it becomes possible to provide a method of suppressing the deposition of a radioactive substance, which can effectively suppress the deposition of cobalt onto a pipe surface of a reactor now in operating, because a titanium oxide can be more efficiently deposited on a metal even by using a chemical liquid with low concentration, even at low temperature and even under the atmospheric pressure, by appropriately controlling the concentration of a residual reducing agent after a reducing-agent decomposition step with respect to the concentration of the dispersing agent in the titanium oxide solution.

Fourth Embodiment

FIG. 9 is a schematic diagram illustrating a whole structure of a recontamination-suppressing treatment system according to the fourth embodiment of the present invention. The system includes a redeposition-suppressing apparatus for implementing the above described method for suppressing the deposition of a radioactive substance according to the present invention, the system being applied, for example, to the recirculation system of the reactor coolant in a boiling-water type reactor, in which the recontamination-suppressing treatment by the deposition of a titanium oxide is conducted after the decontamination of the recirculation system of a reactor coolant.

With reference to FIG. 9, a recirculation system of a reactor coolant includes a recirculation pump 25, and a riser tube nozzle 26 of a jet pump.

On the other hand, a decontamination treatment system includes a main circulation line 7 for decontamination for decontaminating an area 6 to be decontaminated in the recirculation system of the reactor coolant, a circulation pump 8 for decontamination, a chemical liquid tank 9 for preparing a chemical liquid therein, a heater 10, an ozone generator 11 to be used as an oxidation decontamination agent, a mixer 12 for dissolving an ozone gas into the liquid, an ion-exchange resin column 13, and a aggregation tank 14 for accommodating a titanium oxide solution therein.

The aggregation tank 14 is provided with a circulating pump 15, a stirrer 16, a heater 17 for heating, and a turbidity sensor 18 for monitoring the state of aggregation of titanium dioxide.

Incidentally, the stirrer 16 is not necessarily indispensable and may also be appropriately omitted. In addition, because the chemical liquid tank, the heater and the circulation line are included in the decontamination treatment system, these devices may be diverted as an aggregation tank.

The aggregation is started by heating and stirring the titanium oxide solution in the aggregation tank, or by adding and stirring an electrolyte agent. When the aggregation starts, the titanium oxide solution becomes cloudy, and accordingly, it is possible to monitor the start of the aggregation with a turbidity sensor. The state that turbidity becomes approximately 300 degrees or higher is preferable as a deposition condition. When the aggregation has started, the titanium oxide solution in a aggregated state is supplied to the main circulation line for decontamination, and is circulated in the recirculation system. The titanium oxide deposits on a pipe surface by the contact of this titanium oxide solution.

According to the fourth embodiment of the present invention, there can be provided an apparatus for suppressing the deposition of a radioactive substance, which can efficiently deposit the titanium oxide on a surface of a metal, by providing the aggregation tank in the decontamination system and supplying the titanium oxide solution in the optimum state to the area to be decontaminated.

Fifth Embodiment

Figure 10:
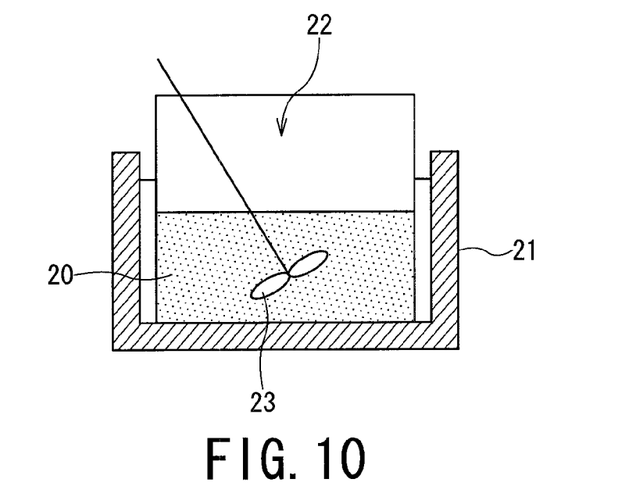
FIG. 10 is an illustrated sectional view of a treatment tank for a waste liquid according to a fifth embodiment of the present invention.

A fifth embodiment according to the present invention will be described hereunder with reference to FIG. 9 and FIG. 10.

The fifth embodiment relates to waste liquid treatment of the titanium oxide solution which has finished the deposition treatment.

The waste liquid after the deposition treatment onto a pipe surface contains mainly a titanium oxide, and a small amount of a residual reductive-decontamination agent and a dispersing agent, as its component. Thus, in the waste liquid, several hundreds ppm levels of the titanium oxide is contained, and it is therefore necessary to remove this titanium oxide from the waste liquid, to purify the waste liquid, and to discharge the waste liquid into an existing waste-water treatment system. However, because a titanium-oxide waste liquid is in a state including a certain extent of remaining dispersibility, and accordingly, a period of time is needed for the sedimentation of the titanium oxide.

Then, a titanium-oxide waste liquid is collected into the aggregation tank 14, and is heated and stirred to progress the aggregation to the state in which the titanium oxide can be easily sedimented.

When the aggregation has progressed, stirring is stopped, and the sludge, which has sedimented at the bottom of the aggregation tank 14, is collected into a waste liquid treatment tank 21 through a discharging line 19. As illustrated in FIG. 10, the sludge is subjected to physical dispersion treatment such as crushing, for instance, by an ultrasonic wave in a waste liquid treatment tank 21. Thereafter, the collected titanium oxide is regenerated and reused by the addition of the dispersing agent 22 and stirring with a stirrer 23.

On the other hand, a supernatant liquid in the aggregation tank 14 is purified in the ion-exchange resin column of the decontamination apparatus and is discharged to an existing discharging system.

According to the fifth embodiment, a load to the ion-exchange resin can be greatly reduced by sedimenting the titanium oxide which occupies the most parts of the waste liquid component, and the amount of a secondary radioactive waste to be produced can be greatly reduced by regenerating and reusing the titanium oxide.

REFERENCE NUMERALS

1 . . . pipe, 2 . . . oxide film, 3 . . . titanium oxide, 4 . . . cobalt, 5 . . . cooling water, 6 . . . reactor coolant recirculation system, 7 . . . main circulation line for decontamination, 8 . . . circulation pump for decontamination, 9 . . . chemical liquid tank, 10 . . . heater, 11 . . . ozone generator, 12 . . . mixer, 13 . . . ion-exchange resin column, 14 . . . aggregation tank, 15 . . . circulation pump, 16 . . . stirrer, 17 . . . heater, 18 . . . turbidity sensor, 19 . . . sludge-discharging line, 20 . . . collected titanium oxide, 21 . . . waste-liquid treatment tank, 22 . . . dispersing agent, 23 . . . stirrer, 25 . . . recirculation pump, 26 . . . riser tube nozzle of jet pump.

The invention claimed is:

1. A method of suppressing deposition of a radioactive substance comprising:
   removing an oxide film from a metallic material surface with which a coolant containing the radioactive substance comes in contact; and
   depositing a titanium oxide onto the metallic material surface after the removing the oxide film,
   wherein the oxide-film removing includes a chemical decontamination comprising an oxidation, a reduction, and a reducing-agent decomposition, and
   the titanium-oxide depositing brings a titanium oxide solution comprising a particulate titanium oxide and a dispersing agent into contact with the metallic material surface after the removing of the oxide film, in which the titanium oxide is aggregated within the solution by adding an electrolytic chemical agent to the titanium oxide solution.

2. The method of suppressing the deposition of the radioactive substance according to claim 1, wherein the titanium oxide solution is accommodated in an aggregation tank provided in a decontamination treatment system.

3. The method of suppressing the deposition of the radioactive substance according to claim 1, wherein an aggregated state of the titanium oxide is monitored with turbidity of the titanium oxide solution.

4. The method of suppressing the deposition of the radioactive substance according to claim 1, wherein the normality ratio A/B is controlled to be about 1 or less, in which A is normality of a residual reducing agent after the chemical decontamination and B is normality of the dispersing agent in the titanium oxide-depositing in the titanium oxide solution, normality representing gram equivalent number of substance in solution, and normality=concentration (g/L)×ionic valence÷molecular weight (g/mol).

5. The method of suppressing the deposition of the radioactive substance according to claim 1, wherein titanium oxide in a titanium-oxide waste liquid after the titanium-oxide depositing is separated and collected by, when an aggregation has processed, stopping a stirring resulting in formation of a sludge including the titanium oxide by sedimentation, and collecting the sludge, and is regenerated and reused.

6. The method of suppressing the deposition of the radioactive substance according to claim 1, wherein the oxide-film removing and the titanium-oxide depositing are conducted during a period in which the operation of a nuclear reactor is stopped.

7. A system for suppressing redeposition of a radioactive substance by adhesion of titanium oxide after deposition onto a reactor coolant recirculation system line of a boiling water reactor, comprising:
   a decontamination system which comprises a main circulation line for circulation of a decontamination liquid;
   a first circulation pump mounted on the main circulation line for circulating the decontamination liquid;
   a chemical liquid tank for adjusting the decontamination liquid;
   a first heater for heating the decontamination liquid in the chemical liquid tank;
   an ozone generator generating oxide decontamination agent;
   a mixer connected to the ozone generator for dissolving ozone gas into solution;
   an ion-exchange resin column mounted on a line branched from the main circulation line; and
   an aggregation tank for accommodating titanium oxide solution, and the aggregation tank including a second circulation pump, a stirrer, a second heater, and a turbidity sensor for monitoring an aggregation condition of a titanium dioxide.

* * * * *